United States Patent [19]

Haese

[11] 4,001,374

[45] Jan. 4, 1977

[54] PROCESS FOR REMOVING AMMONIA FROM GASES

[75] Inventor: Egon Haese, Bochum-Linden, Germany

[73] Assignee: Dr. C. Otto & Comp. G.m.b.H., Bochum, Germany

[22] Filed: July 2, 1974

[21] Appl. No.: 485,232

[30] Foreign Application Priority Data

July 2, 1973 Germany .......................... 2333518

[52] U.S. Cl. .............................. 423/237; 423/242; 423/519; 423/541 A
[51] Int. Cl.² .......................................... C01C 3/00
[58] Field of Search ...... 423/237, 238, 519, 541 A, 423/242

[56] References Cited

UNITED STATES PATENTS

| 1,740,342 | 12/1929 | Hansen | 423/541 A |
|---|---|---|---|
| 2,152,454 | 3/1939 | Baehr | 423/238 |
| 2,233,841 | 3/1941 | Lepsoe | 423/242 |
| 3,645,671 | 2/1972 | Griffin et al. | 423/541 A |
| 3,676,059 | 7/1972 | Welty | 423/519 |
| 3,695,829 | 10/1972 | Griffin et al. | 423/541 A |
| 3,822,339 | 7/1974 | Mizuno et al. | 423/238 |

FOREIGN PATENTS OR APPLICATIONS

| 532,965 | 11/1956 | Canada | 423/541 A |
|---|---|---|---|
| 809,585 | 4/1969 | Canada | 423/519 |
| 1,467,005 | 3/1969 | Germany | 423/541 A |
| 2,143,444 | 11/1972 | Germany | 423/541 A |
| 1,004,524 | 9/1965 | United Kingdom | 423/541 A |

Primary Examiner—Oscar R. Vertiz
Assistant Examiner—Eugene T. Wheelock
Attorney, Agent, or Firm—Brown, Murray, Flick & Peckham

[57] ABSTRACT

A process to remove ammonia from gases by washing the gases with an inorganic acid of ammonium bisulfite. The ammonia removed from the gas transforms the washing liquid into ammonium salt solution. This salt solution then undergoes a separate processing by washing it with gases bearing sulfur dioxide to regenerate ammonium bisulfite acid, a portion of which is returned for further washing of the gases and another portion is diverted to an apparatus for concentrating the acid solution up to 70% to 80% by weight after which the concentrated acid solution is delivered to a combustion chamber where burning thereof produces combustion products bearing sulfur dioxide which are used in the process to wash the ammonium bisulfite salt solution to regenerate ammonium bisulfite acid.

7 Claims, 1 Drawing Figure

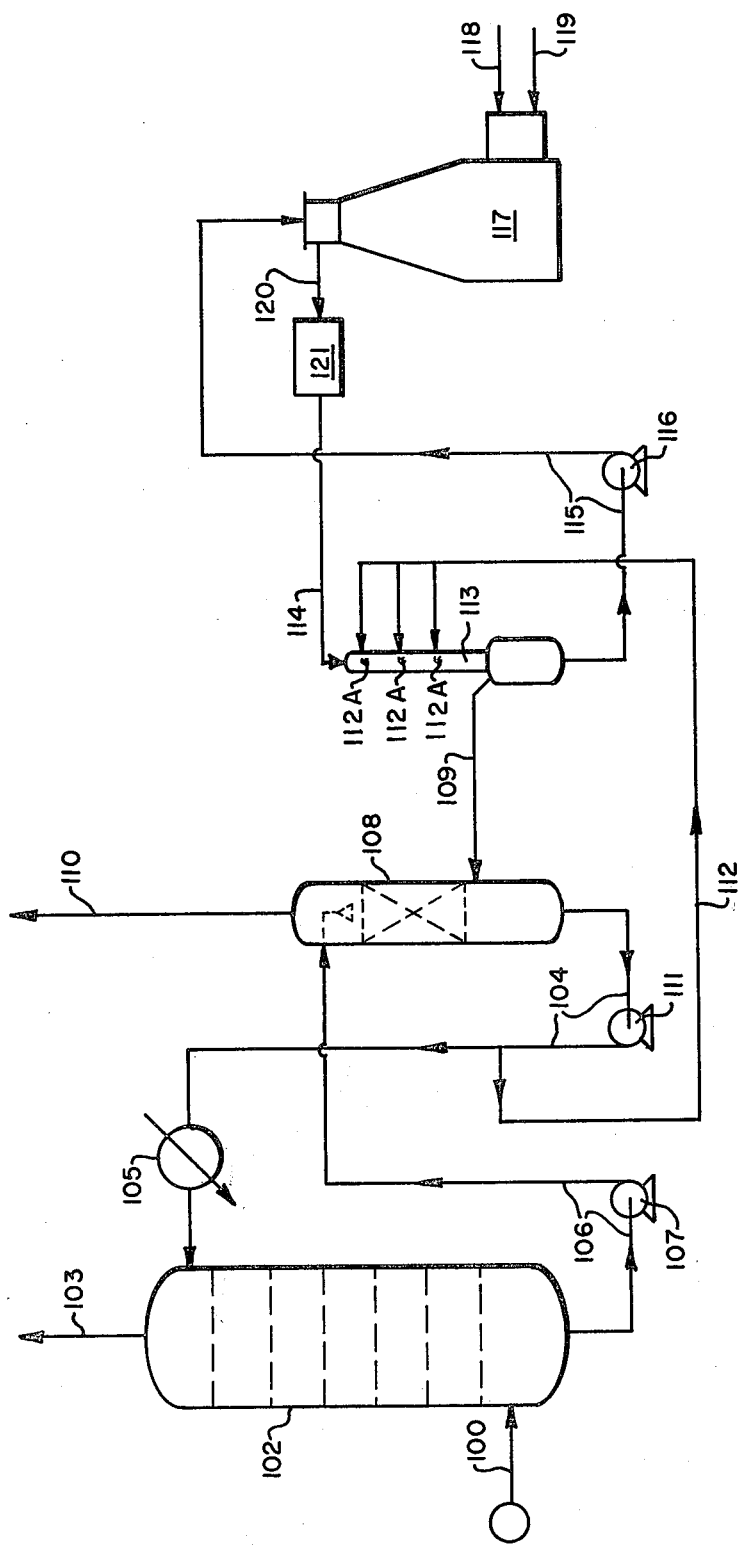

PROCESS FOR REMOVING AMMONIA FROM GASES

BACKGROUND OF THE INVENTION

This invention relates to a process for removing ammonia from gases, especially gases from coke ovens and for the conversion of the removed ammonia into harmless materials.

In copending application Ser. No. 367,532, filed June 6, 1973 and assigned to the same Assignee as this invention, there is disclosed a process for the removal of ammonia from ammonia bearing gases, especially gases from coke ovens and the conversion of the ammonia into harmless materials. In this process, the ammonia is forced out of the gases by means of an inorganic acid fed into a circulating system and the ammonia salt produced thereby is heated and burned by the addition of a heating medium at a temperature at which only nitrogen and water vapor (steam) are produced as combustion products. The process being such that the resulting acid anhydride which is also formed as a combustion product is fed back, after suitable cooling, into the circulating system containing the washing medium. In this process, two forms of washing solution are disclosed, namely sulfuric acid and hydrochloric acid.

The present invention is directed to perfecting aspects of the process described in the aforesaid copending application Serial No. 367,532, and the present invention concerns a special case where acidic ammonium bisulfite is selected as the inorganic acid which is introduced into the circulating system for washing ammonia out of gases.

SUMMARY OF THE INVENTION

It is an object of the present invention to provide a process for the removal of ammonia from ammonia bearing gases by washing the gases with a solution of ammonium bisulfite which is transformed by the ammonia into ammonium sulfite salt which is withdrawn to undergo a regeneration process by washing the salt solution with sulfur dioxide to renew ammonium bisulfite for use in the further washing of ammonia from gases.

It is a further object of the present invention to provide a process for removing ammonia from gases by washing the gases with a solution of ammonium bisulfite which is regenerated and a portion of regenerated ammonium bisulfite undergoes a combustion process to produce gases bearing sulfur dioxide which is used to regenerate the washing solution of ammonium bisulfite.

It is another object of the present invention to provide an improved process for washing ammonia from gases wherein the washing solution is regenerated by delivering a portion thereof to a concentrating chamber and supplying the chamber with residual heat from the process to achieve a 70% to 80% by weight concentration of the washing solution for the subsequent burning thereof to produce combustion products useful in the regeneration process for the washing solution.

According to the present invention, there is provided a process for removing ammonia from gases wherein the process includes the steps of, forming ammonium sulfite salt solution by washing gases containing ammonia with a washing liquid of inorganic acidic ammonium bisulfite, regenerating the acidic ammonium bisulfite by washing the ammonium sulfite salt solution with gases bearing sulfur dioxide, diverting a portion of the regenerated acidic ammonium bisulfite, burning the diverted portion of the regenerated acidic ammonium bisulfite to yield gases bearing sulfur dioxide, and directing the burnt gases bearing sulfur dioxide to wash said ammonium bisulfite salt solution for the regeneration of acidic ammonium bisulfite.

More particularly, according to the present invention, the washing solution which is formed into ammonium sulfite when washing the gases is regenerated into ammonium bisulfite, the regeneration process being one wherein the solution employed to wash ammonia from the gases is subjected to a gas which contains sulfur dioxide. A partial flow of the usable washing fluid is drawn off after the regeneration process and burnt so as to derive sulfur dioxide to regenerate the washing solution.

Practice has shown that when attempts are made to obtain an end ammonia content at a value of 1 to 2 grams per 100 cubic meters of purified gases, the concentration of the ammonium bisulfite in the washing solution should lie between 15% and 40% by weight and preferably between 20% and 30% by weight.

A concentration up to about 70% to 80% by weight is recommended for carrying out the combustion of a partial flow of ammonium bisulfite solution in a combustion chamber incident to the production of sulfur dioxide. Such a concentration of ammonium bisulfite solution can be achieved by extracting water from the washing solution in a process wherein the solution is put into contact with hot gases. Combustion gases containing sulfur dioxide may be used as the hot gas for this purpose before the combustion gases are introduced into the regeneration stage of the process.

The combustion gases from a reactor employed for the combustion process, will usually have a temperature ranging from 900° C to 1000° C and the useful heat of the combustion gases is appropriately first employed in a heat recovery installation such as, for example, a steam heater. During this procedure, the combustion gases containing water vapor and nitrogen in addition to sulfur dioxide, are cooled to 300° C to 500° C and preferably between 350° C to 450° C. The gases when cooled in this manner are fed at this temperature range to an apparatus for concentrating the washing solution to be fed to the reactor.

In order to concentrate the washing solution to subsequently undergo a combustion process, it has been found especially useful to introduce a stream of smoke-gases at the top of a vertically-arranged tube while the washing solution of acidic ammonium bisulfite is introduced through a series of nozzles distributed over the height of the tube. At the lower end of the vertical tube, there is an enlarged chamber from which at the top thereof there is drawn off combustion gas containing sulfur dioxide, which gas has undergone cooling to a temperature within the range of about 80° C to 100° C. At the bottom of the enlarged chamber, the concentrated washing solution is drawn off at about the same temperature after which the concentrated washing solution is fed into the combustion chamber of the reactor for the combustion process.

The chemical reactions which occur in the ammonia washer, the regeneration washer and in the reactor for the combustion process correspond to the combustion of ammonia in accordance with the following equations:

$NH_3$-washer: $2(NH_4)HSO_3 + 2 NH_3 \rightarrow 2(NH_4)_2SO_3$

SO$_2$-washer: $2(NH_4)_2SO_3 + 2SO_2 + 2H_2O \rightarrow 4(NH_4)HSO_3$

Combustion: $2(NH_4)HSO_3 + 3/2\ O_2 \rightarrow 2SO_2 + N_2 + 5H_2O$

Sum: $2NH_3 + 3/2\ O_2 \rightarrow N_2 + 3H_2O$

The introduction of bisulfite into the reactor for the combustion process had the great advantage that acidic bisulfite is highly soluble in water and this has a favorable action on the consumption of the heating medium.

The process of the present invention has the special advantage that the combustion products are not fed back into the washing circuit and thus no dilution and reduction of the calorific value occurs in the gases to be purified.

These features and advantages of the present invention as well as others will be more fully understood when the following description is read in light of the accompanying drawing which schematically illustrates the washing process according to the present invention, important parameters of which have been described hereinbefore.

The gases to be purified enters an ammonia washer 102 through a pipeline 101. Pipeline 103 exhausts the purified gases from the washer. These gases are free of ammonia. The ammonia washer 102 is equipped with suitable components and structure for the exchange of substances such as, for example a conversion or exchange bed. Fresh ammonium bisulfite solution is transmitted by pipeline 104 to the top of the washer 102. A cooler 105 is incorporated in the pipeline 104 and draws off part of the heat of the reaction produced in the circuit through a cooling medium, such as water, for example. The washing solution when brought into contact with the ammonia in the gas over the substance exchange bed, results in the production of ammonium sulfite. The solution is drawn off from the base of the washer 102 through pipeline 106 through the agency of a pump 107 and the solution is transmitted thereby to the head of a SO$_2$ washer 108.

In the washer 108, the ammonium sulfite solution is brought into contact with an SO$_2$ constituent of combustion waste gas which is fed into the lower part of the washer 108 by pipeline 109. Pipeline 110 passes the waste combustion gas from the washer 108 into the open air. The washer 108 also contains suitable material exchange devices. Ammonium bisulfite solution is drawn from the sump of the column in the washer 108 and passed into the ammonia washer 102 by way of pipeline 104, pump 110 and cooler 105.

The flow of the solution in pipeline 104 is so large that it contains the production of ammonium bisulfite. Part of the solution flowing in pipeline 104 is transmitted by pipeline 112 to a quenching apparatus 113. The quenching apparatus consists of a vertical tube 113 and into the upper part, as shown in the drawing, the solution from pipeline 112 is sprayed in a downward direction by nozzles or jets 112A. Hot combustion gas at a temperature of about 300° C to 500° C and which is to be quenched, is fed by a line 114 to the top of the quenching apparatus 113 and flows in the same downward direction as the solution. The quench tube is enlarged at the bottom by a chamber so that the gas and the solution can be separated from each other. The solution and gas have now been reduced to a temperature of between 80° C to 110° C. The gas is drawn off from the top of this enlarged chamber and conveyed to the SO$_2$ washer 108 by pipeline 109. The bisulfite solution which has been concentrated to 80% to 90% by weight is delivered from the bottom of this chamber through pipeline 115 by a pump 116 to a reactor 117. The reactor 117 is used for burning the diverted portion of the regenerated acidic ammonium bisulfite to yield a gas bearing sulfur dioxide as a combustion product. The reactor 117 receives a heating medium which can also consist of the gases to be treated, through pipeline 118 and combustion air fed to the reactor through pipeline 119. In the reactor 117, the ammonia salt is converted to nitrogen, water vapor and sulfur dioxide at temperatures between 900° C and 1000° C. The waste flue gases of the combustion leaves the reactor through pipeline 120. The waste gases of the combustion are cooled down to between 300° C and 500° C and preferably between 350° C to 450° C in a heat extraction apparatus 121. The heat extraction apparatus 121 can be a boiler for the production of steam and/or a preheater for combustion air. Pipeline 114 delivers the cooled waste combustion gas to the quenching apparatus 113.

The process of the present invention employs the sulfur compound as the ammonia carrier. Normally, this sulfur circuit is involved.

It is necessary to add very small amounts of sulfur compounds to the circulating system due to small losses which occur and which depend on factors in the design of the plant such as, for example, the temperature at the top of the absorber, column height, etc.

It is expedient to employ sulfuric acid for this purpose. This sulfur supplement may be introduced at any convenient location into the circulating system.

Although the invention has been shown in connection with a certain specific embodiment, it will be readily apparent to those skilled in the art that various changes in form and to those skilled in the art that various changes in form and arrangement of parts may be made to suit requirements without departing from the spirit and scope of the invention.

I claim as my invention:

1. A process for removing ammonia from coke oven gases, said process including the steps of:
    forming ammonium sulfite salt solution by washing said coke oven gases containing ammonia with a washing liquid essentially including at least 15% by weight inorganic acidic ammonium bisulfite,
    regenerating acidic ammonium bisulfite by washing the formed ammonium sulfite salt solution with gases bearing sulfur dioxide,
    using a portion of the regenerated acidic ammonium bisulfite for continuous washing of ammonia from the coke oven gases while diverting a portion of the regenerated acidic ammonium bisulfite,
    burning the diverted portion of the regenerated acidic ammonium bisulfite to recover gases essentially including sulfur dioxide, nitrogen and water vapor, and
    using the sulfur dioxide for the recovered gases from said step of burning for said step of regenerating acidic ammonium bisulfite.

2. The process according to claim 1 wherein the concentration of the salt in the washing liquid for removing ammonia from gases lies between 15% and 40% by weight.

3. The process according to claim 1 wherein the concentration of the salt in the washing liquid for removing ammonia from gases lies between 20% to 30% by weight.

4. The process according to claim 1 including the further step of concentrating the washing liquid prior to said burning to form a concentrated salt solution between 70% to 80% by weight by the combination with hot gases.

5. The process according to claim 4 wherein the said step of concentrating the washing solution is further characterized as including the steps of cooling a stream of recovered gases liberated by said step of burning by feeding such gases into the top of a vertically-arranged tube, discharging through nozzles at the upper part of the vertically-arranged tube the regenerated acidic ammonium bisulfite for the concentration thereof, withdrawing from an enlarged chamber at the lower end of the vertically-arranged tube the gaseous medium including gaseous sulfur dioxide, and discharging from the bottom of the enlarged chamber concentrated regenerated acidic ammonium bisulfite for the subsequent step of said burning the diverted portion of the regenerated acidic ammonium bisulfite.

6. The process according to claim 1 wherein the yielded gases bearing sulfur dioxide by said step of burning are cooled down to a temperature within the range of 300° C to 500° C prior to said step of directing the burnt gases to wash the ammonium bisulfite salt solution.

7. The process according to claim 1 wherein the yielded gases bearing sulfur dioxide by said step of burning are cooled down to a temperature within the range of 350° C to 450° C prior to said step of using the sulfur dioxide of the recovered gases.

* * * * *